UNITED STATES PATENT OFFICE.

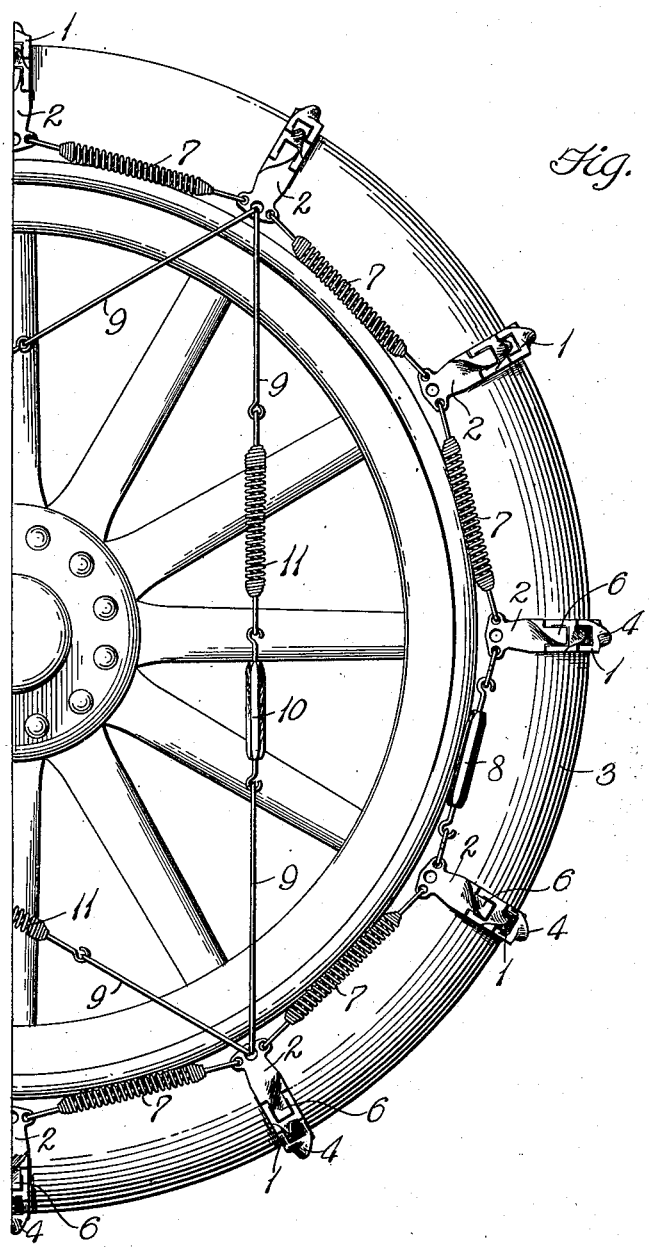

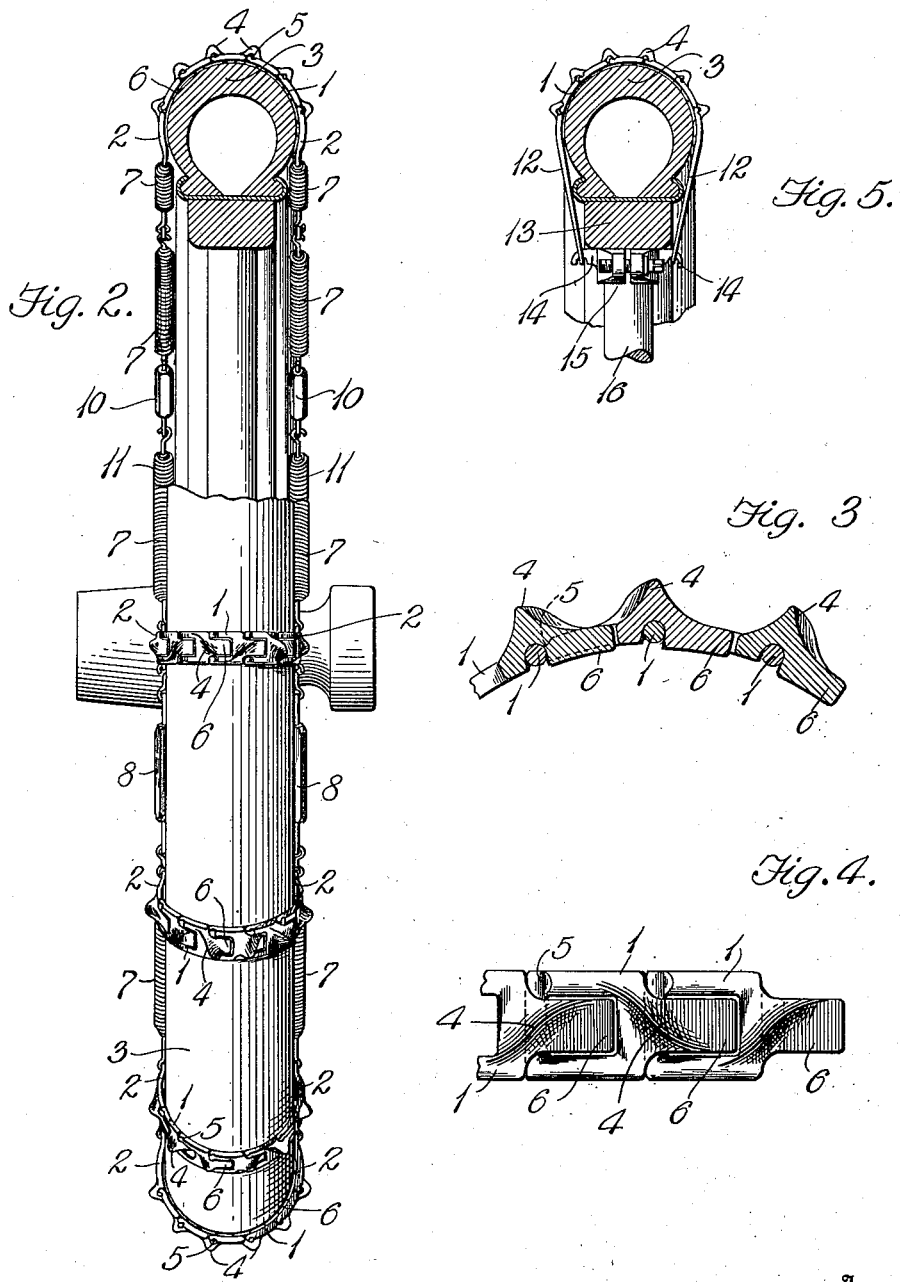

ALEXANDER PURDIE, OF WYANDOTTE, MICHIGAN.

ANTISKIDDING DEVICE.

1,142,909.  Specification of Letters Patent.  Patented June 15, 1915.

Application filed May 8, 1913. Serial No. 766,256.

*To all whom it may concern:*

Be it known that I, ALEXANDER PURDIE, a citizen of the United States of America, residing at Wyandotte, in the county of Wayne and State of Michigan, have invented certain new and useful Improvements in Antiskidding Devices, of which the following is a specification, reference being had therein to the accompanying drawings.

This invention relates to an anti-skidding device for vehicle wheels and to an arrangement thereof adapted especially for use on pneumatic tires.

The invention also includes means that prevent side slipping in either direction and operate without injury to the face of the tire.

The invention also includes means whereby the device may be adjusted for tires of different cross sectional diameters without the use of tools.

The invention consists in the matters hereinafter set forth and particularly pointed out in the appended claim.

In the drawings, Figure 1 is a view in side elevation of a portion of the wheel and tire equipped with the device that embodies features of the invention; Fig. 2 is a view partially in elevation and partially in cross section of the wheel and anti-skidding device; Figs. 3 and 4 are views in detail, enlarged, of chain links; and Fig. 5 is a view in detail showing the method of fastening the device to prevent slipping on the periphery of the wheel.

As herein shown, the device consists of a plurality of chain sections that are formed of a series of detachable links 1 with side holding members 2, the sections being of sufficient length to substantially embrace the face of a tire 3 to which they may be applied. Obliquely disposed spuds 4 of opposite inclinations are formed on the links, being so proportioned that they bite into the surface of a roadway and prevent side slip in either direction. The links, as indicated in Figs. 3 and 4, are each formed with a depression indicated at 5 whereby when they are turned into angular relation to each other a link may be slipped off from its companion member. Thus by the addition or withdrawal of one or more links from a section, the latter may be made of any necessary length to properly embrace the tire. Furthermore each link has a tongue or extension 6 that overlies the opening in the companion link and thereby a substantially continuous tread surface for each section is obtained that does not admit gravel and dirt between the tire and the section.

By reference to Fig. 4 it will be observed that the spuds 4 are at the juncture of the tongues 6 and the end walls of the link, and that each spud has a compound curved crest and walls gradually merging into the tongues and body portion of the links.

Each side holding member 2 is provided with apertures at the inner end to receive tension members indicated at 7. Preferably these consist of eye bolts engaging the apertures and retained in the closely coiled end portions of a central body spring as indicated. One or more turn buckles indicated at 8 are used for imposing the necessary tension on the side members.

As a further means for preventing displacement of the device when mounted on a tire, cross stays 9 connect corresponding side holding members each having a take up or turn buckle member 10 and a spring member 11 between the ends. In order to prevent creeping around the tire, one or more of the sections has side members 12 that extend past the felly 13 of the wheel and are hooked over the properly fashioned ends or lugs 14 of a split ring 15 that is clamped around a wheel spoke 16.

The device thus obtained presents means which effectively eliminate tendency to side slip or skid, which have a broad smooth bearing upon the tire so that they do not tend to cut it and that are readily adjustable for any size of wheel or tire.

Obviously, changes in the details of construction may be made without departing from the spirit of my invention and I do not care to limit myself to any particular form or arrangement of parts.

What I claim is:—

In an anti-skidding device, a series of tread sections, each formed of rectangular links having rectangular openings, each link having a tongue at one end thereof with the upper side of said tongue provided with a transverse groove adjacent the end wall of the link to receive the opposite end wall of a companion link, spuds at the juncture of the tongues and end walls of the links and having compound curved crest and walls gradually merging into the tongues and body portion of the links, and the spuds of some links being disposed at an inclination reverse to that of other links.

In testimony whereof I affix my signature in presence of two witnesses.

ALEXANDER PURDIE.

Witnesses:
 ANNA M. DORR,
 C. R. STICKNEY.